US009898189B2

(12) United States Patent
Chen et al.

(10) Patent No.: US 9,898,189 B2
(45) Date of Patent: Feb. 20, 2018

(54) USER TRIAL FEEDBACK METHOD, ELECTRONIC DEVICE AND COMPUTER-READABLE MEDIUM

(71) Applicant: HTC Corporation, Taoyuan (TW)

(72) Inventors: Wan-Yun Chen, Taoyuan (TW); Kuan-Chuan Su, Taoyuan (TW); Kuan-Chi Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 435 days.

(21) Appl. No.: 14/660,130

(22) Filed: Mar. 17, 2015

(65) Prior Publication Data

US 2015/0264133 A1    Sep. 17, 2015

Related U.S. Application Data

(60) Provisional application No. 61/953,951, filed on Mar. 17, 2014.

(51) Int. Cl.
*G06F 3/00* (2006.01)
*G06F 3/0488* (2013.01)
*G06F 3/0482* (2013.01)

(52) U.S. Cl.
CPC ........ *G06F 3/04883* (2013.01); *G06F 3/0482* (2013.01)

(58) Field of Classification Search
CPC ........................... G06F 3/04883; G06F 3/0482
See application file for complete search history.

(56) References Cited

U.S. PATENT DOCUMENTS

| | | | | |
|---|---|---|---|---|
| 6,351,829 B1* | 2/2002 | Dupont | ............... | G06F 11/0736 714/11 |
| 7,293,023 B1* | 11/2007 | Akiti | ............... | H04L 45/00 |
| 2006/0206411 A1* | 9/2006 | Rau | ............... | G06Q 40/04 705/37 |
| 2007/0156644 A1* | 7/2007 | Johnson | ............... | G06F 21/577 |
| 2008/0046786 A1* | 2/2008 | Patel | ............... | G06F 11/0742 714/100 |
| 2008/0320343 A1* | 12/2008 | Eickmeyer | ............... | G06F 11/0709 714/57 |
| 2011/0057801 A1* | 3/2011 | Logan | ............... | G08B 25/08 340/584 |
| 2011/0314438 A1* | 12/2011 | Surazski | ............... | G06F 11/0742 717/100 |
| 2013/0219365 A1* | 8/2013 | Rago | ............... | H04L 63/08 717/125 |
| 2014/0101110 A1* | 4/2014 | Rittle | ............... | H04L 69/40 707/654 |
| 2014/0237304 A1* | 8/2014 | Lai | ............... | G06F 11/0742 714/57 |

* cited by examiner

*Primary Examiner* — Nicholas Augustine
(74) *Attorney, Agent, or Firm* — Birch, Stewart, Kolasch & Birch, LLP

(57) ABSTRACT

A user trial feedback method, an electronic device, and a computer-readable medium are provided. The user trial feedback method includes the following steps. A launch signal is received to record an image of current frame of the touch screen and launch the user trial feedback tool. An information is inputted by the user in the user trail feedback tool, and logs related to the inputted information are collected and upload to a server along with the recorded image of the current frame.

21 Claims, 12 Drawing Sheets

| Occurrence rate |
|---|
| One time |
| Frequent |
| Always |

FIG. 3F

| Symptom Type |
|---|
| SIM card not detected |
| Dropped call while in motion |
| Unable to dial |
| Unable to end call |
| Unable to answer call |
| Others |

3:24 WEDNESDAY
MARCH 12, 2014

Feedback status  3:35 PM
Uploading...
8192/11805 KB (69%)

Report issue/feedback
Tap or press Power +
Home keys

No SIM card 940
110

FIG. 3K

3:24 WEDNESDAY
MARCH 12, 2014

Feedback status  3:32 PM
Collecting data....

Report issue/feedback
Tap or press Power +
Home keys

No SIM card 940
110

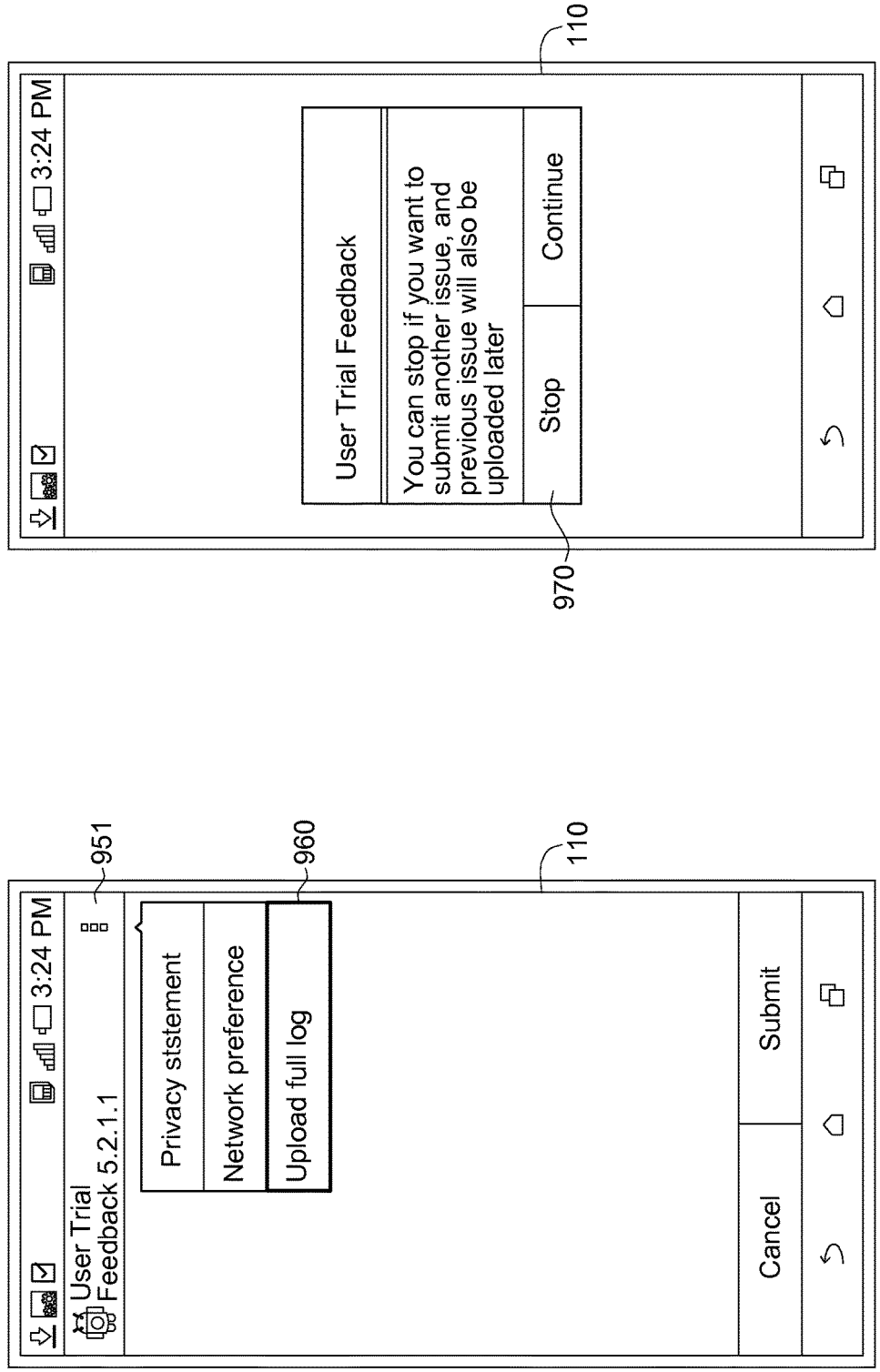

USER TRIAL FEEDBACK METHOD, ELECTRONIC DEVICE AND COMPUTER-READABLE MEDIUM

This application claims the benefit of U.S. provisional application Ser. No. 61/953,951, filed Mar. 17, 2014, the subject matter of which is incorporated herein by reference.

TECHNICAL FIELD

The disclosure relates in general to a user trial feedback method, an electronic device and a computer-readable medium.

BACKGROUND

In the modern age, in which the technology is changing with each passing day, various electronic devices bring many conveniences to human's life. In some case, one electronic device may have some issue that the electronic device cannot operate normally. For example, the electronic device may shut down while operating or the battery may drain out quickly while idle. For fixing the electronic device or improving the design of the electronic device, the manufacturer needs to get some data relating the issue from the user.

SUMMARY

The disclosure is directed to a user trial feedback method, an electronic device and a computer-readable medium. Some data relating an issue of the electronic device can be reported to a manufacturer by performing the user trial feedback method for fixing the electronic device or improving the design of the electronic device.

According to one embodiment, a user trial feedback method of an electronic device is provided. The user trial feedback method includes the following steps. Receiving a launch signal. In response to receiving the launch signal, recording a current frame of a touch screen and launching the user trial feedback tool, wherein the current frame is a screenshot of the touch screen displayed before receiving the launch signal. Receiving an input of an information from the user. Collecting a part of all of the logs stored in the electronic device, wherein the collected logs are the logs related to the inputted information. Uploading the image of the recorded current frame and the collected logs to a server.

According to another embodiment, an electronic device is provided. The electronic device includes a touch screen, a launching unit, a storage unit, a collecting unit, and an uploading unit. The launching unit is for receiving a launch signal, and recording a current frame of the touch screen and launching the user trial feedback tool in response to the launch signal is received, wherein the current frame is a screenshot of the touch screen displayed before receiving the launch signal, wherein after the user trial feedback tool is launched, the touch screen further receiving an input of an information from the user. The storage unit is for storing all of the logs. The collecting unit is for collecting a part of the all of the logs, wherein the collected logs are the logs related to the inputted information. The uploading unit is for uploading the image of the recorded current frame and the collected logs to a server.

According to an alternative embodiment, a computer-readable medium is provided. The computer-readable medium contains instructions for performing a user trial feedback method of an electronic device. The user trial feedback method comprises the following steps. Receiving a launch signal. In response to receiving the launch signal, recording a current frame of a touch screen and launching the user trial feedback tool, wherein the current frame is a screenshot of the touch screen displayed before receiving the launch signal. Receiving an input of an information from the user. Collecting a part of all of the logs stored in the electronic device, wherein the collected logs are the logs related to the inputted information. Uploading the image of the recorded current frame and the collected logs to a server.

BRIEF DESCRIPTION OF THE DRAWINGS

FIGS. 3A to 3M illustrate one embodiment of the steps of the user trail feedback method.
FIGS. 6A to 6B illustrate one embodiment of the steps of manually uploading all of the logs.

Figure 1:
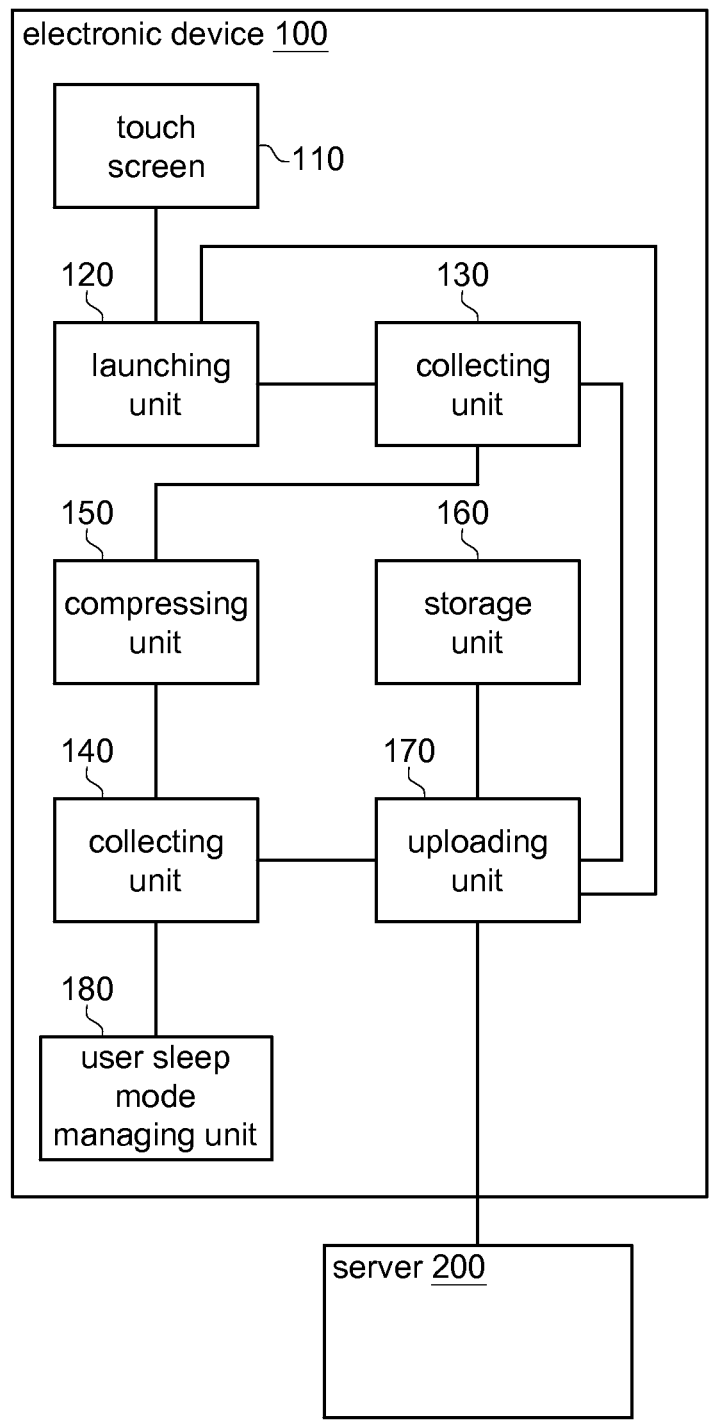
FIG. 1 shows an electronic device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
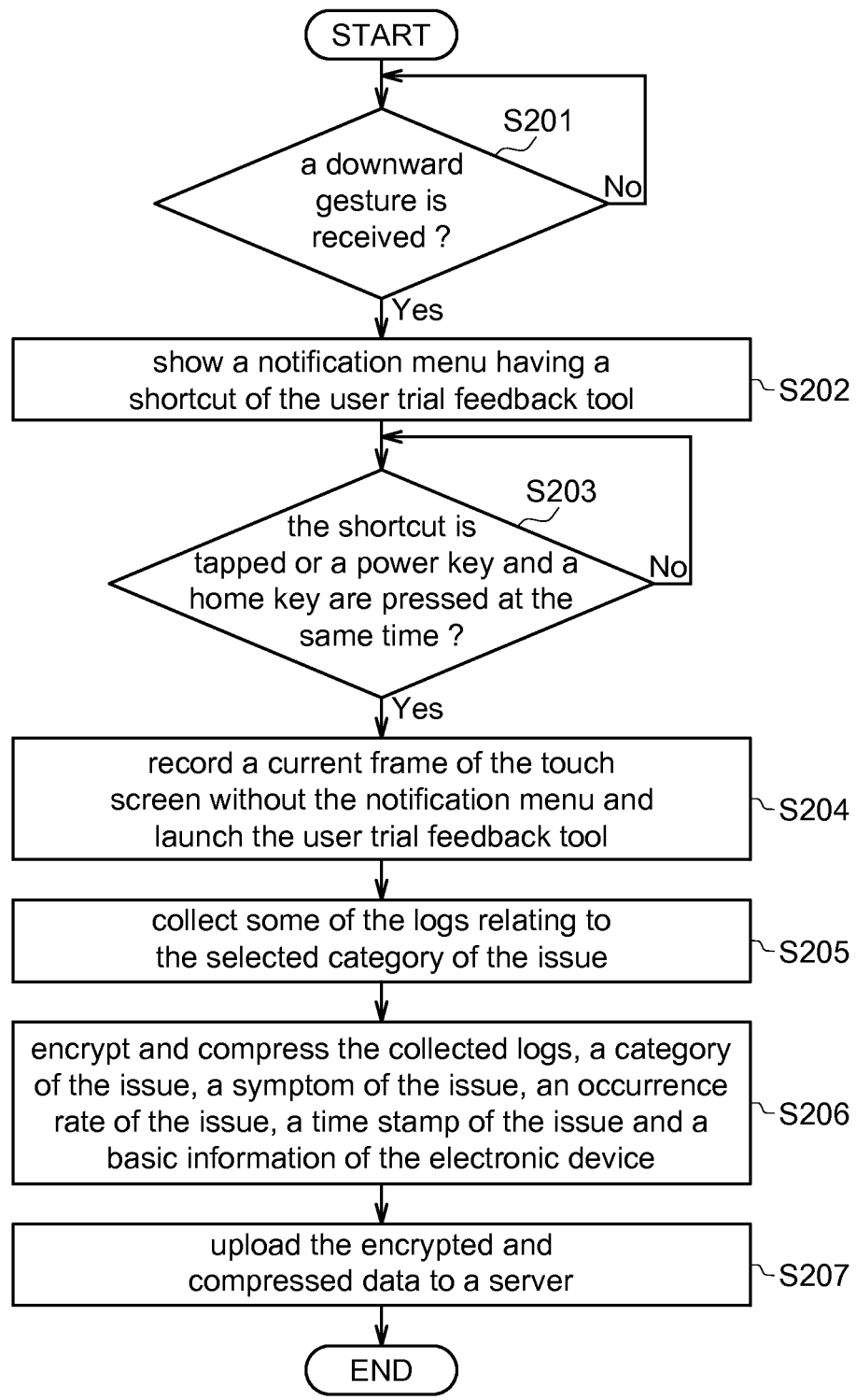
FIG. 2 shows a flowchart of a user trial feedback method.

Please referring to FIGS. 1 and 2, FIG. 1 shows an electronic device 100, and FIG. 2 shows a flowchart of a user trial feedback method. The electronic device 100 may be, for example, a smart phone, a tablet computer, or a smart wearable device. The electronic device 100 may comprise a touch screen 110, a launching unit 120, a collecting unit 130, a collecting unit 140, a compressing unit 150, a storage unit 160, an uploading unit 170, and a user sleep mode managing unit 180.

The touch screen 110 is used for displaying information and receiving a touch signal. For example, but not limited to, the touch screen 110 may be a combination of a touch panel and a display panel, such as a LCD panel, an OLED panel or an electronic paper.

The launching unit 120 is used for launching a user trial feedback tool, which may be an application program or a firmware. The collecting units 130 and 140 are used for collecting data. The compressing unit 150 is used for encrypting and compressing data. The uploading unit 170 is used for uploading data to a server 200. For example, each of the launching unit 120, the collecting units 130, 140, the compressing unit 150 and the uploading unit 170 may be a circuit chip, a circuit board, a storage device storing a plurality of program codes.

The storage unit 160 is used for storing data. For example, but not limited to, the storage unit 160 may be a memory, a hard disk, an optical disk, or a cloud disk.

In some case, the electronic device 100 may have some issues that the electronic device 100 cannot operate normally. For example, the electronic device 100 may, for example, shut down while operating, the battery may drain out quickly while idle, the application programs have some bugs need to be fixed, or SIM card cannot be detected. For fixing the electronic device 100, including the hardware component and software programs, or improving the design of the electronic device 100, some data relating those issues can be reported to the manufacturer by performing the user trial feedback method. Please referring to FIGS. 3A to 3M, one embodiment of the steps of the user trail feedback method is illustrated as follows. For example, as shown in FIG. 3A, the message 910 that "No SIM card" is shown on the touch screen 110. That is to say, the SIM card cannot be detected.

In step S201, the touch screen 110 determines whether a downward gesture 920 is received. A user may use his finger 930 to touch the touch screen 110 and slide his finger 930 downward to generate the downward gesture 920. If the downward gesture 920 is received, then the process proceeds to step S202. In another embodiment, a notification bar (not shown in FIG. 3) is displayed on top of the touch screen 110, and the display area of the notification bar is touched by the finger 930 and then the downward gesture is received to pull down the notification bar, then the process proceeds to step S202.

Figure 3B:
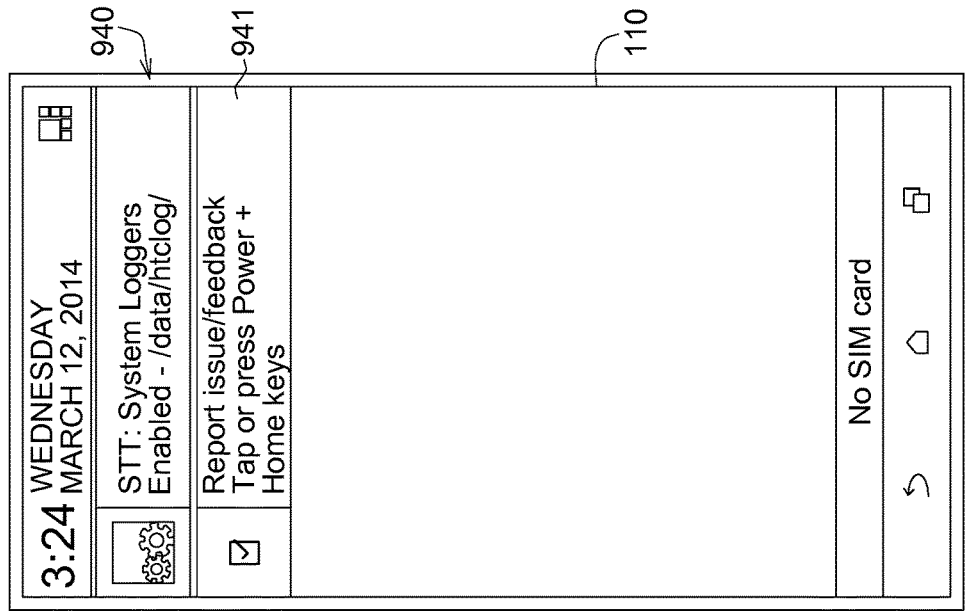
Figure 3A:
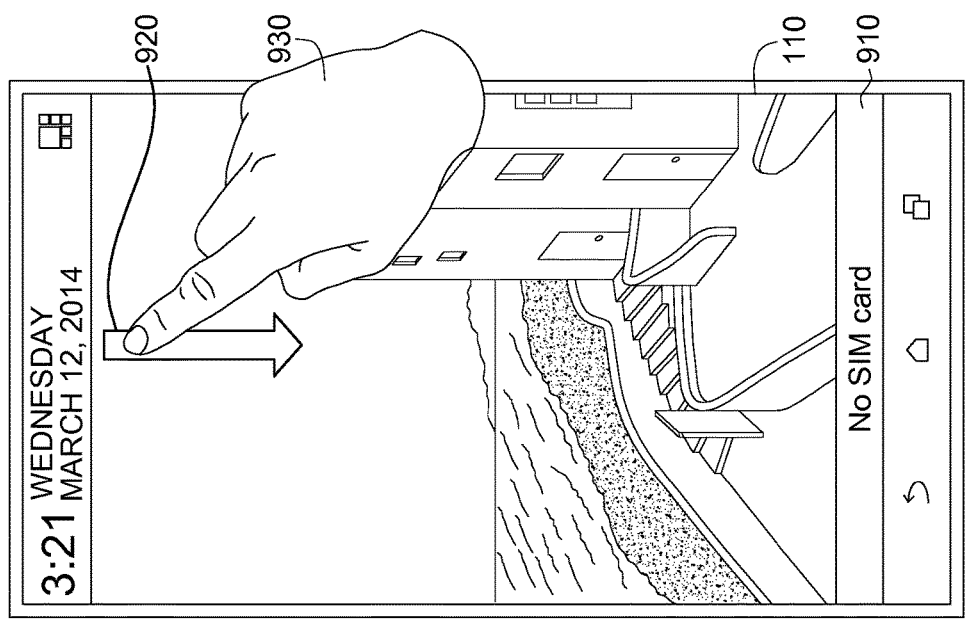

In step S202, referring to FIG. 3B, a notification menu 940 having a shortcut 941 of the user trial feedback tool is shown on the touch screen 110. In another embodiment, the notification menu 940 is displayed in the area generated after pull down the notification bar. In still another embodiment, the notification menu may be generated by another means, for example but not limited to, activating a virtual key or a hardware key.

In step S203, referring to FIG. 3B, the launching unit 120 determines whether the shortcut 941 corresponding to the user trial feedback tool is tapped. If the shortcut 941 is tapped, then the process proceeds to step S204.

Figures 3C, 3D:
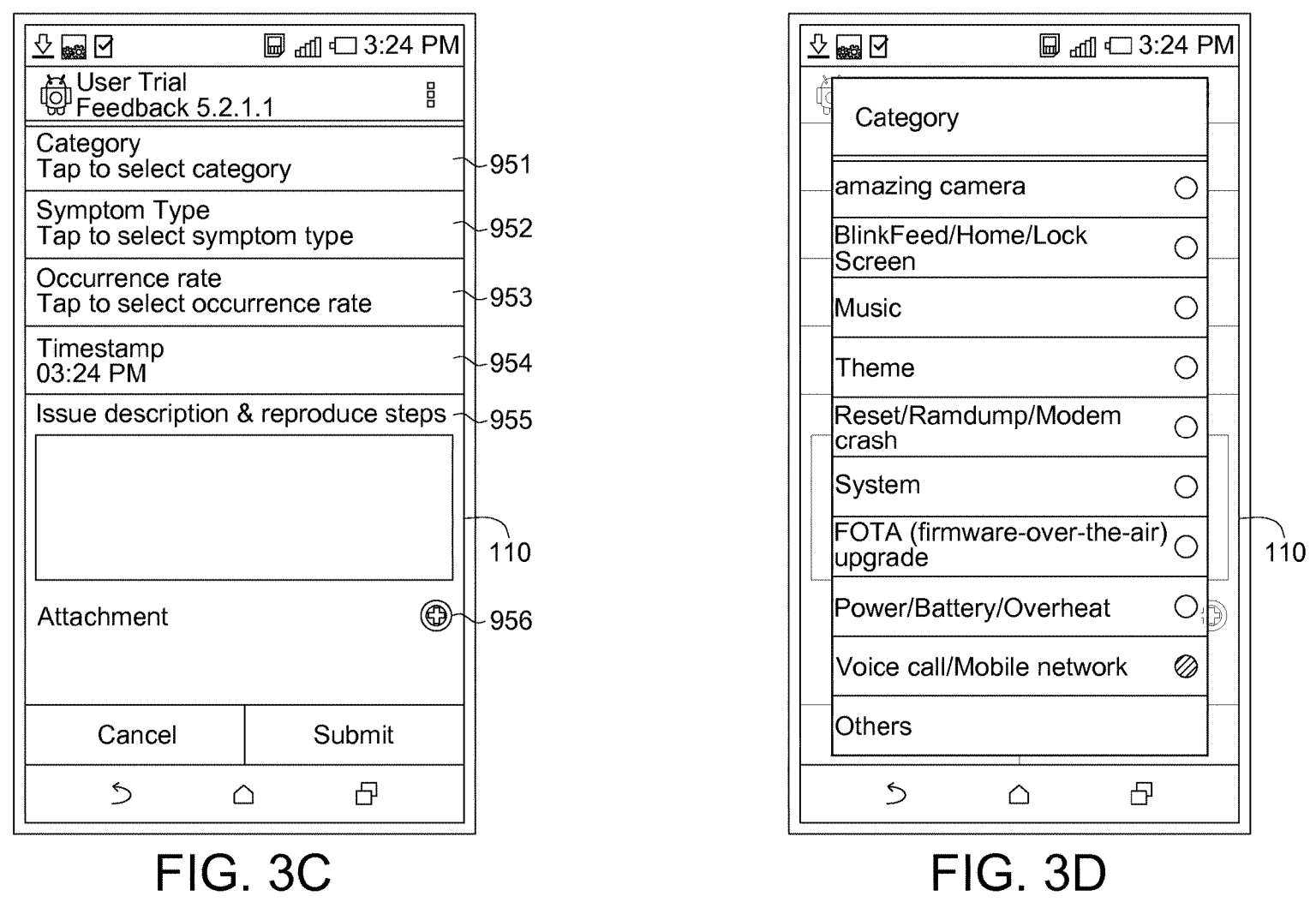

In step S204, referring to FIG. 3C, the launching unit 120 records a current frame, such as the frame shown in FIG. 3A, of the touch screen 110 without the notification menu 940 and launches the user trial feedback tool. The current frame is the frame of the touch screen before activating the notification menu 940, for example, but not limited to, the screenshot of the crashed or hanged software program, the screenshot of currently used software program that the user thinks the design or the user interface is not easy to use and need to be improved, etc. After the user trial feedback tool is launched, some buttons including, but no limited to, a category selecting button 951, a symptom selecting button 952, an occurrence rate selecting button 953, a time stamp selecting button 954, a text inputting column 955, and an attachment selecting button 956 are shown on the touch screen 110 for the user to input information.

In another embodiment, instead of generating the notification menu 940 by touch and downward gesture or tapping the shortcut corresponding to the user trial feedback tool, the user may active a power key and a home key simultaneously to directly record the current frame and launch the user trial feedback tool. In this embodiment, the power key and home key may be, for example but not limited to, a hardware key, a software virtual key displayed on touch screen 110, a software key on a touch pad.

In still another embodiment, the user may directly record the current frame and launch the user trial feedback tool by another means, for example but not limited to, activating a virtual key or a hardware key; activating a combination of a plurality of virtual key/hardware key, through a specific gesture on the touch screen 110 or a specific air gesture; shaking or another specific movement for the electronic device 100.

The category selecting button 951 is used for selecting a category of an issue. For example, referring to FIG. 3D, the categories to be selected may include different kind of software programs, applications, functions, features, for example but not limited to, "amazing camera", "BlinkFeed/Home/Lock Screen", "Music", "Theme", "Reset/Ramdump/Modem crash", "System", "FOTA (firmware-over-the-air) upgrade", "Power/Battery/Overheat", "Voice call/Mobile network", "Wi-Fi", "Bluetooth", "Accessory", "Hardware", "Application", "Playstore downloaded application", "Suggestion" and "Others."

The symptom selecting button 952 is used for selecting a symptom of the issue. For example, referring to FIG. 3E, after the category "Voice call/Mobile network" is selected, the symptoms to be selected may include "SIM card not detected", "Dropped call while in motion", "Unable to dial", "Unable to end call", "Unable to answer call", "Missed call", "Unable to connect mobile network with network indicator", "No voice during call", "Voice call quality with Intermittent voice dropouts", "Voice call quality with static noise", "Zero signal strength", "Shows 1X/2G/3G signal even within 3G/4G coverage", and "Others."

The occurrence rate selecting button 953 is used for selecting an occurrence rate of the issue. For example, referring to FIG. 3F, the occurrence rates to be selected may include "One time", "Frequent", and "Always."

The time stamp selecting button 954 is used for selecting a time stamp of the issue. For example, but not limited to, the occurrence time of the issue or the time that the user aware the issue. In one embodiment, referring to FIG. 3G, a default of the time stamp is the time of launching the user trial feedback tool.

Figure 3H:
Figure 3G:

Referring to FIG. 3H, the text inputting column 955 is used for receiving text information for describing the issue. A hint may be shown in the text inputting column. In one embodiment, the displayed hint may be different according to the category and/or the symptom selected by the user. For example, referring to FIG. 3I, if the category "Others" is selected, the launching unit 120 may prompt a message 956 as a reminder to request the user for inputting some information.

Figures 3I, 3J:
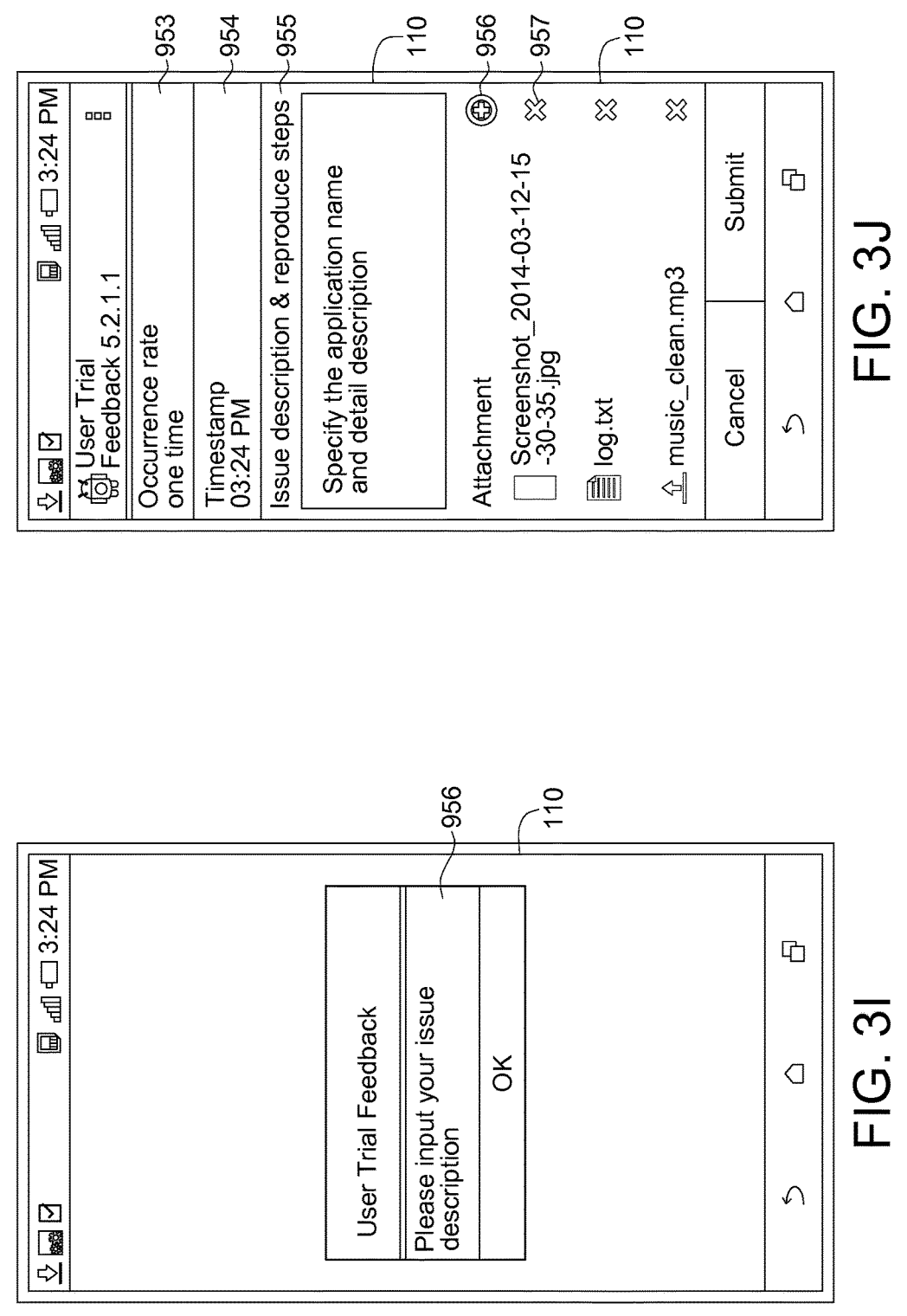

Referring to FIG. 3J, the attachment selecting button 956 is used for selecting a file to be uploaded. The image of the current frame is a predetermined file to be uploaded. In one embodiment, a small image of the current frame is also shown for indicating that the image of the current frame is attached to upload. Other file can be selected to upload. Moreover, a cancel button 957 is used for cancelling a file to be uploaded.

In step S205, referring to FIG. 3K, the collecting unit 130 collects some of the logs relating to the selected category of the issue. In this step, the collecting unit 130 does not collect all of the logs (full log) stored in the electronic device 100.

In step S206, the compressing unit 150 encrypts and compresses the collected logs, the category of the issue, the symptom of the issue, the occurrence rate of the issue, the time stamp of the issue. The encrypted and compressed data is stored in the storage unit 160. In another embodiment, basic information of the electronic device is also encrypted and compressed.

Figure 3M:
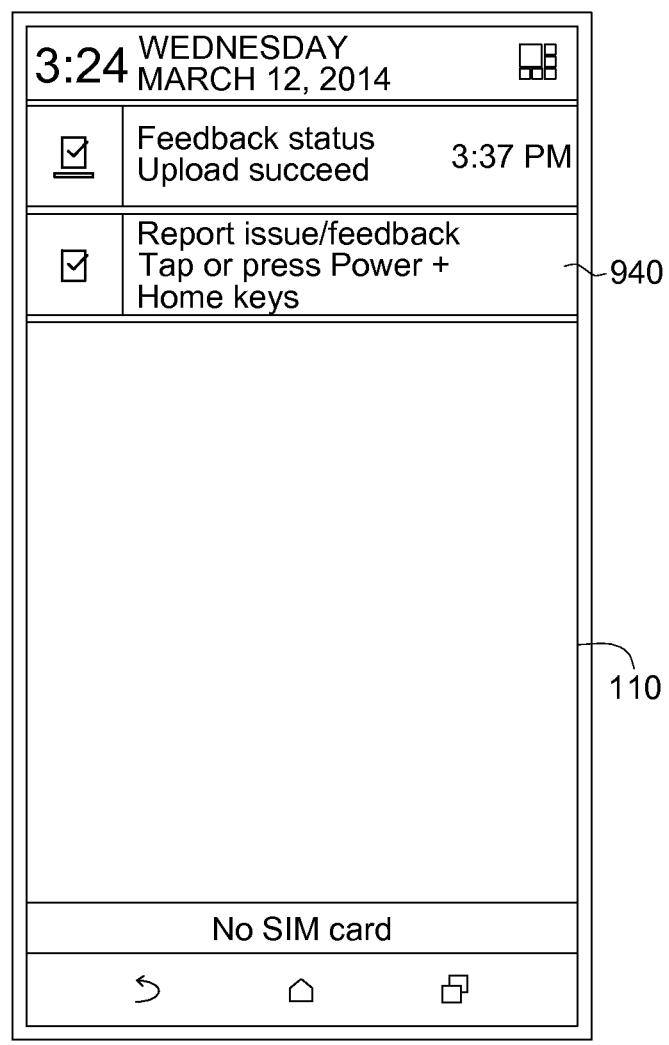

In step S207, referring to FIGS. 3L to 3M, the uploading unit 170 uploads the encrypted and compressed data, i.e. the collected logs relating to the category of the issue, the current frame, the category of the issue, the symptom of the issue, the occurrence rate of the issue, the time stamp of the issue and the basic information of the electronic device, to the server 200.

Base on above, if the electronic device 100 has some issues that the electronic device 100 cannot operate normally or the user has some suggestion for the improvement of the electronic devices, some data relating the issue or the suggestion can be reported to the manufacturer.

Figure 4:
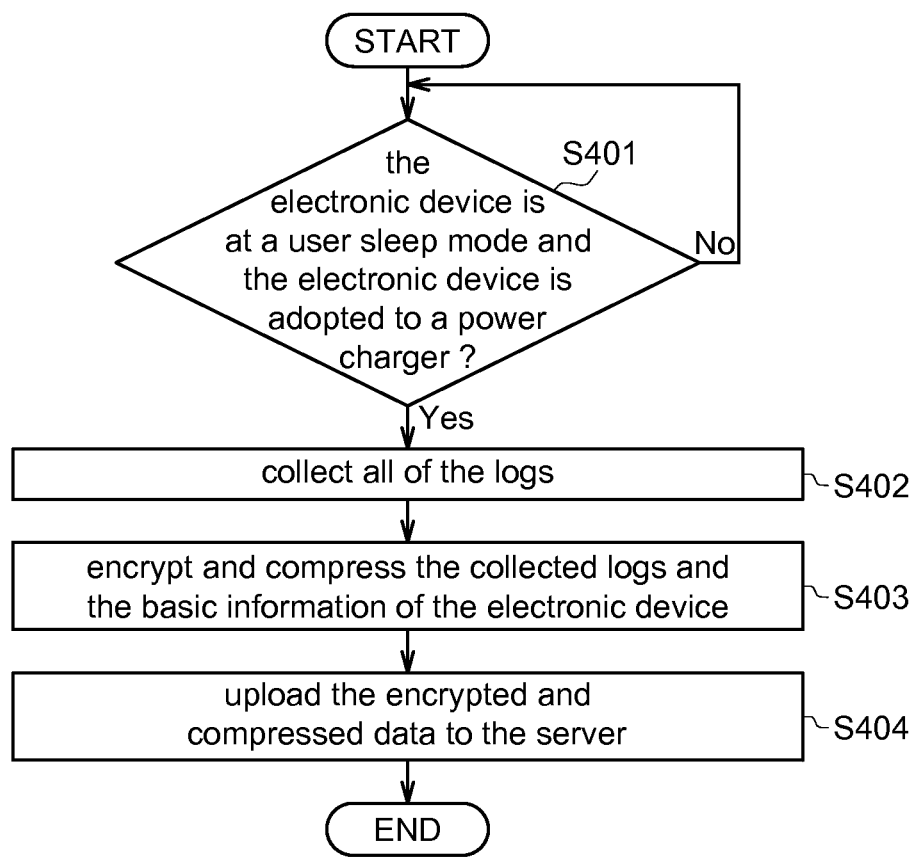
FIG. 4 shows a flowchart of some steps for automatically uploading all of the logs (full log) of the electronic device.

In one embodiment, all of the logs are useful for analyzing the performance of the electronic device 100. However, when all of the logs are uploaded, the network will be congested and the system loading will be increased. Please referring to FIG. 4, FIG. 4 shows a flowchart of steps for automatically uploading all of the logs of the electronic device 100. By performing the steps in FIG. 4, all of the logs can be uploaded without any network congestion and any system overloading.

In step S401, the user sleep mode managing unit 180 determines whether the electronic device 100 is at a user sleep mode and whether the electronic device 100 is adopted to a power charger. If the electronic device 100 is at the user sleep mode and is adopted to a power charger, then the process proceeds to step S402. When the electronic device 100 is at the user sleep mode, it is deemed that the user is sleeping. When the user is sleeping, the user usually turns off the touch screen 110. That is to say, the longest period that the touch screen 110 is turned off can be used to predict the beginning and the end of the user sleep mode.

For predicting the beginning and the end of the user sleep mode of the electronic device 100, the user sleep mode managing unit 180 creates 7 on/off tables from Monday to Sunday. Every on/off table has two status (on, off status) for recording the times of on/off status of the touch screen 110, for example every hour, in a day. The default value during AM 7:00 to AM 1:00 next day is "on", and the default value during AM 1:00 to AM 7:00 is "off."

If the touch screen 110 is turned on more than one minute, then the on/off table will be marked as "on." The user sleep mode managing unit 180 updates turn on/off status at PM 11:50. The first few weeks, for example 4 weeks, are a learning period. The prediction of the user sleep mode begins after the learning period, for example from the fifth week. If there is not enough data in the learning period, the predication will be based on existing data. For example, the prediction of the user sleep mode on Monday of the third week is based on that of the first week and the second week.

After the learning period, the prediction of the user sleep mode is based on previous record of each week by a voting method. For example, if in the records of the beginning of the user sleep mode of previous 4 Mondays, AM 1:00 is 3 times and AM 2:00 is 1 time, then the prediction of the beginning of the user sleep mode on Monday is AM 1:00 because the amount of the times of AM 1:00 is more that AM 2:00. If in the records of the beginning of the user sleep mode of previous 4 Mondays, AM 1:00 is 2 times and AM 2:00 is 2 times, then the prediction of the beginning of the user sleep mode on Monday is AM 2:00 because the time of AM 2:00 is later than AM 1:00. The prediction of the end of the user sleep mode is similar to the prediction of the beginning of the user sleep mode. In another embodiment, the times of on/off status in the user sleep mode may be input manually by the user.

In step S402, the collecting unit 140 collects all of the logs. In another embodiment, the collecting unit 130 and the collecting unit 140 may be the same unit.

In step S403, the compressing unit 150 encrypts and compresses the collected logs. Those encrypted and compressed data is stored in the storage unit 160. In another embodiment, the basic information of the electronic device 100 is also encrypted and compressed.

In step S404, the uploading unit 170 uploads the encrypted and compressed data, i.e. all of the logs and the basic information of the electronic device, to the server 200.

Base on above, all of the logs is uploaded during the user sleep mode for preventing from any network congestion and any system overloading.

Figure 5:
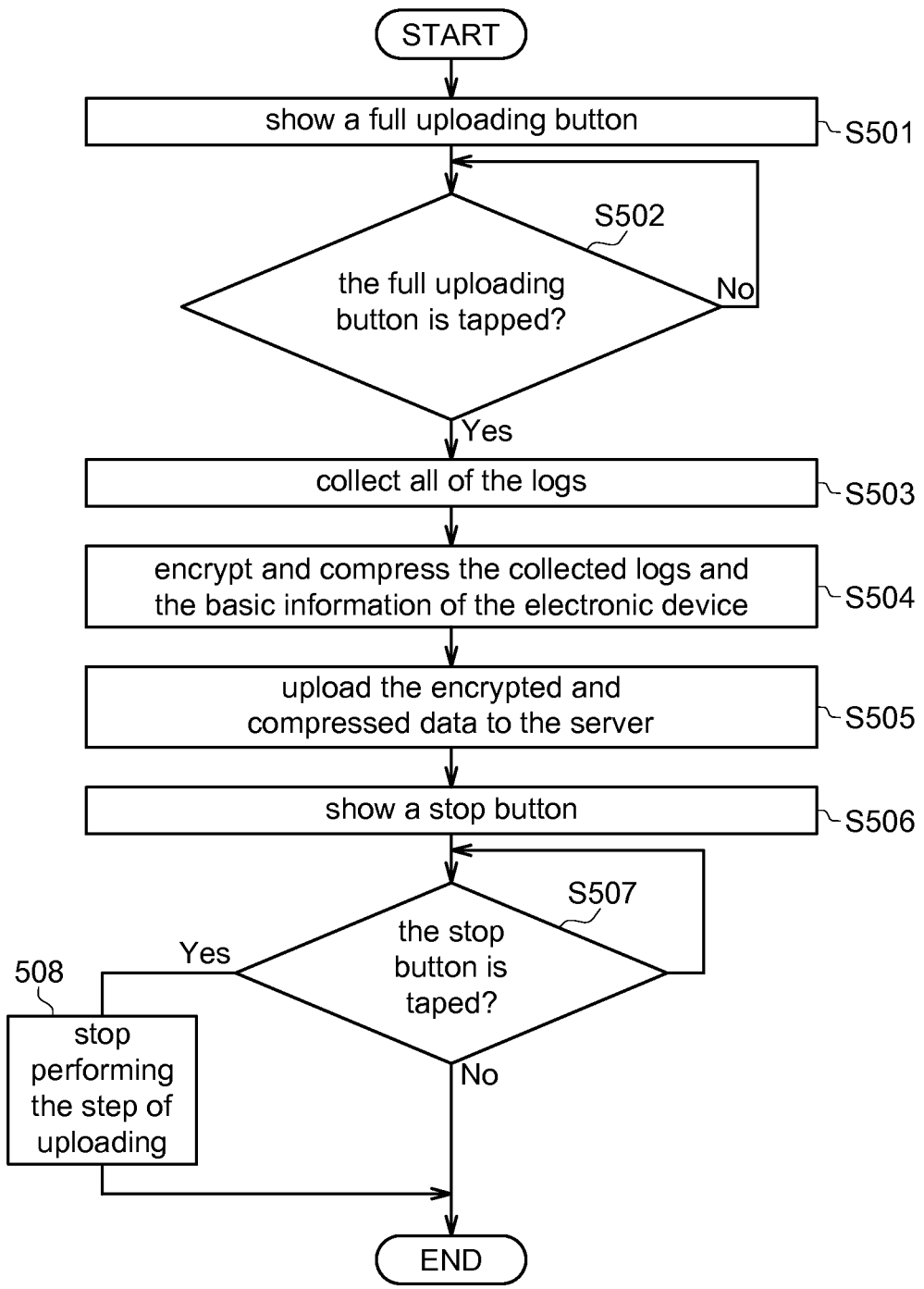
FIG. 5 shows a flowchart of some steps for manually uploading all of the logs of the electronic device.

In one embodiment, all of the logs can be uploaded at any time through a command provided by the user. Please referring to FIG. 5 to FIG. 6B, FIG. 5 shows a flowchart of some steps for manually uploading all of the logs of the electronic device 100, and FIGS. 6A and 6B illustrate one embodiment of the steps of manually uploading all of the logs. By performing the steps in FIG. 5, all of the logs can be uploaded at any time.

In step S501, the touch screen 110 shows a full uploading button 960. The full uploading button 960 may be a button shown in the notification menu 940 or a button shown in a page of a home user interface or an all application user interface.

In step S502, the launching unit 120 determines whether the full uploading button 960 is tapped. If the full uploading button 960 is tapped, then the process proceeds to step S503.

In step S503, the collecting unit 140 collects all of the logs.

In step S504, the compressing unit 150 encrypts and compresses the collected logs. Those encrypted and compressed data is stored in the storage unit 160. In another embodiment, the basic information of the electronic device 100 is also encrypted and compressed.

In step S505, the uploading unit 170 uploads the encrypted and compressed data, i.e. all of the logs and the basic information of the electronic device, to the server 200.

Base on above, all of the logs can be uploaded at any time, and the uploading process can be stop to report another issue.

In another embodiment, the method for manually uploading all of the logs may further comprise a stop button 970 to temporally stop the uploading process in some conditions, for example, the user want to use the electronic device 100, the battery level of the electronic device 100 is low, the user want to report another issue, etc. In step S506, the touch screen 110 shows a stop button 970. In still another embodiment, the electronic device 100 will automatically stop the uploading process if the battery level is low or in other pre-determined specific conditions.

In step S507, the launching unit 120 determines whether the stop button 970 is taped. If the stop button 970 is tapped, then the process proceeds to step S508.

In step S508, the uploading unit 170 stops performing the step of uploading all of the logs and the basic information. After the uploading process has been stopped, the user may re-start the uploading process anytime.

In one embodiment, the all of the logs are stored in the electronic device every day, and if the all of the logs of yesterday has been uploaded, and the all of the logs of yesterday will also be collected along with the all of the logs of today and then upload to the server.

Base on above, all of the logs can be uploaded at any time, and the uploading process can be stop if the user wants to or the condition of the electronic device 100 is not suitable to continue the uploading process.

According to above embodiments, if the electronic device 100 may have some issue that the electronic device 100 cannot operate normally or the user has any suggestions for the electronic device, some data relating the issue or suggestion can be reported to the manufacturer by performing the user trial feedback method.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A user trial feedback method of an electronic device, comprising:
   receiving a launch signal;
   in response to receiving the launch signal, recording a current frame of a touch screen and launching a user trial feedback tool, wherein the current frame is a screenshot of the touch screen displayed before receiving the launch signal;
   receiving an input of an information from a user;
   collecting a part of all of a plurality of logs stored in the electronic device, wherein the collected logs are the logs related to the inputted information; and
   uploading an image of the recorded current frame and the collected logs to a server.

2. The user trial feedback method according to claim 1, wherein the step of receiving the launch signal comprises:
   displaying a notification menu having a shortcut corresponding to the user trial feedback tool on the touch screen; and
   receiving a tapping signal on the shortcut corresponding to the user trial feedback tool.

3. The user trial feedback method according to claim 2, wherein the step of receiving the launch signal further comprises:
   displaying a notification bar on a top of the touch screen;
   receiving a touch and drag-downward touch signal on the notification bar to pull down the notification bar; and
   displaying the notification menu in an area generated by pulling down the notification bar.

4. The user trial feedback method according to claim 1, wherein the step of receiving the launch signal further comprises:
   receiving an activating signal to activate a power key and a home key simultaneously.

5. The user trial feedback method according to claim 1, wherein after the user trial feedback tool is launched, at least one of a category selecting button, a symptom selecting button, an occurrence rate selecting button, and a time stamp selecting button is displayed on the touch screen for respectively selecting a category of an issue, a symptom of the issue, an occurrence rate of the issue, and a time stamp of the issue.

6. The user trial feedback method according to claim 5, wherein a default of the time stamp is the time of launching the user trial feedback tool.

7. The user trial feedback method according to claim 5, wherein after the user trial feedback tool is launched, the method further comprises:
   displaying a hint on the touch screen for receiving a text information, wherein the hint is different according to the category or symptom selected by the user.

8. The user trial feedback method according to claim 5, wherein the collected logs are related to at least one of the selected category of the issue, the selected symptom of the issue, and the time stamp of the issue.

9. The user trial feedback method according to claim 1, further comprising:
   collecting all of the logs;
   determining whether the electronic device is adopted to a power charger;
   determining whether the electronic device is in a user sleep mode; and
   in response to determining the electronic device is adopted to the power charger and in the user sleep mode, uploading all of the logs.

10. The user trial feedback method according to claim 9, wherein all of the logs are stored in the electronic device every day, and the method further comprises:
    determining whether all of the logs of yesterday have been uploaded; and
    in response to determining the all of the logs of yesterday have not been uploaded, collecting all of the logs of yesterday along with all of the logs of today.

11. An electronic device, comprising:
    a launching unit for receiving a launch signal, recording a current frame of a touch screen, and launching the user trial feedback tool in response to the launch signal; wherein the current frame is a screenshot of the touch screen displayed before receiving the launch signal; and after the user trial feedback tool is launched, the touch screen further receives an input of an information from a user;
    a storage unit for storing all of a plurality of logs;
    a collecting unit for collecting a part of all of the logs, wherein the collected logs are the logs related to the inputted information; and
    an uploading unit for uploading an image of the recorded current frame and the collected logs to a server.

12. The electronic device according to claim 11, wherein the launching unit is further for displaying a notification menu having a shortcut corresponding to the user trial feedback tool on the touch screen, and receiving a tapping signal on the shortcut corresponding to the user trial feedback tool.

13. The electronic device according to claim 12, wherein the launching unit is further for displaying a notification bar on top of the touch screen, receiving a touch and drag-downward touch signal on the notification bar to pull down the notification bar, and displaying the notification menu in an area generated by pulling down the notification bar.

14. The electronic device according to claim 11, wherein the launching unit is further for receiving an activating signal to activate a power key and a home key simultaneously.

15. The electronic device according to claim 11, wherein after the user trial feedback tool is launched, the touch screen displays at least one of a category selecting button, a symptom selecting button, an occurrence rate selecting button, and a time stamp selecting button for respectively selecting a category of an issue, a symptom of the issue, an occurrence rate of the issue, and a time stamp of the issue.

16. The electronic device according to claim 15, wherein a default of the time stamp is the time of launching the user trial feedback tool.

17. The electronic device according to claim 15, wherein after the user trial feedback tool is launched, the touch screen displays a hint on the touch screen for receiving a text information, wherein the hint is different according to the category or symptom selected by the user.

18. The electronic device according to claim 11, wherein the collected logs are related to at least one of the selected category of the issue, the selected symptom of the issue, and the time stamp of the issue.

19. The electronic device according to claim 11, further comprising:

a user sleep mode managing unit, for predicting a time period of a user sleep mode at which the user of the electronic device is sleeping; and an uploading unit for uploading all of the logs collected by the collecting unit during the user sleep mode, if the electronic device is determined as being in the user sleep mode and being adopted to a power charger.

20. The electronic device according to claim 19, wherein all of the logs are stored in the electronic device every day, and in response to determining that the all of the logs of yesterday have not been uploaded, the collecting unit collects all of the logs of yesterday along with all of the logs of today.

21. A computer-readable medium containing instructions for performing a user trial feedback method of an electronic device, the user trial feedback method comprising:

receiving a launch signal;

in response to receiving the launch signal, recording a current frame of a touch screen and launching the user trial feedback tool, wherein the current frame is a screenshot of the touch screen displayed before receiving the launch signal;

receiving an input of an information from a user;

collecting a part of all of a plurality of logs stored in the electronic device, wherein the collected logs are the logs related to the inputted information; and uploading an image of the recorded current frame and the collected logs to a server.

\* \* \* \* \*